United States Patent [19]

Hart et al.

[11] Patent Number: 5,687,929
[45] Date of Patent: Nov. 18, 1997

[54] EXTENSIONS FOR STORAGE BINS

[75] Inventors: Jack E. Hart, Bellevue; Michael J. Leenhouts, Bellingham, both of Wash.

[73] Assignee: Hexcel Corporation, Plesanton, Calif.

[21] Appl. No.: 496,823

[22] Filed: Jun. 29, 1995

[51] Int. Cl.$^6$ ............................................ B64D 11/00
[52] U.S. Cl. ........................... 244/118.1; 244/118.5; 244/119
[58] Field of Search .................. 244/118.1, 118.5, 244/119, 117 R, 137.5, 137.2; 312/266, 269, 246, 247, 248, 272, 319.1; 105/321, 315; 5/9 R, 10 R

[56] References Cited

U.S. PATENT DOCUMENTS

| | | |
|---|---|---|
| 3,102,607 | 9/1963 | Roberts . |
| 4,490,883 | 1/1985 | Gauron . |
| 4,799,631 | 1/1989 | Humphries et al. . |
| 4,907,762 | 3/1990 | Bock et al. . |
| 4,947,762 | 8/1990 | Perzl et al. . |
| 5,108,048 | 4/1992 | Chang . |
| 5,129,597 | 7/1992 | Manthey et al. . |
| 5,395,074 | 3/1995 | Hart et al. . |

FOREIGN PATENT DOCUMENTS

| | | |
|---|---|---|
| 0279620A1 | 8/1988 | European Pat. Off. . |
| 0311771A1 | 4/1989 | European Pat. Off. . |
| 0348130 | 12/1989 | European Pat. Off. . |

OTHER PUBLICATIONS

O'Lone, Richard, "Boeing, Proposed New 727, 707 Interior," *Aviation Week*, Apr. 28, 1969, pp. 32–33.

*Primary Examiner*—Galen L. Barefoot
*Attorney, Agent, or Firm*—Christensen, O'Connor, Johnson & Kindness

[57] ABSTRACT

Extensions for carry-on luggage storage bins in cabins of aircraft, trains, ships, and the like, that increase bin storage capacity. The extensions are adapted to be mounted on a frontal opening of an existing luggage bin. The extensions include a substantially planar rectangular base having vertical bulkheads at opposite farthest-apart ends thereof, and a substantially planar top portion extending between upper ends of the bulkhead to form a rectangular box shape with open from and rear. The rear of the extension is adapted to be mounted onto the frontal opening of the bin, thereby extending the lateral dimensions of the bin, while the front of the extension may be supplied with a door.

15 Claims, 3 Drawing Sheets

EXTENSIONS FOR STORAGE BINS

FIELD OF THE INVENTION

The invention provides luggage bins of expanded capacity for use in aircraft, trains, and the like. More particularly, the invention provides a bin extension that is adapted for mounting on openings of existing bins to increase luggage storage space while maintaining safety and providing an aesthetically pleasing appearance.

BACKGROUND OF THE INVENTION

With air travel becoming increasingly commonplace for business and short vacation trips, there has been a significant increase in passenger demand for increased storage space in the aircraft cabin for carry-on items of luggage. These items of luggage are favored by the modem traveler, especially those traveling light, for their convenience and the elimination of a waiting period at an airport destination for stowed luggage to be unloaded from the airplane cargo bay. However, a significant proportion of aircraft were not originally designed and built to meet this increased need for the provision of carry-on luggage. Consequently, the luggage space provided is frequently inadequate so that passengers have the choice of either forcing luggage into limited space, thereby potentially damaging contents and creasing clothing, or stowing the luggage beneath the seat in front of them—an uncomfortable option that reduces leg room.

The Federal Aviation Authority (FAA) has set standards and regulations for luggage bins in aircraft cabins. In general, the bins should be sized so that they do not cause a safety hazard by intrusion into the passenger aisle space. Further, they should also be sized in accordance with the load bearing strength of their supporting structure.

In certain aircraft, such as the McDonnell Douglas DC-9/MD80, the cabin is not centrally divided by a passenger aisle, but is divided so that one side of the aisle has two abreast seats while the other side has three such seats. Nevertheless, the overhead carry-on luggage bins are of equal size on either side of the aisle. Thus, passengers seated on the three-seat side of the aisle each have only two-thirds of the luggage space as does a passenger on the two-seat side of the aisle.

As shown schematically in FIG. 1 (prior art), the bins B on the three-seat side of the aisle A do not approach the aisle space but their inboard ends 10' terminate in the region above the central seat 12'. The available space above the aisle seat 14' on the three-seat side of the aisle suggests that larger bins may be retrofitted onto this side of the aircraft, subject to the constraints mentioned above. Thus, the bins must meet all FAA regulations and the imbalance in weight between the two sides of the aircraft, that may result from having more passengers and luggage on one side, should be manageable. Heath Tecna Aerospace Company has developed larger-sized aircraft cabin interior stowage bins for installation above the three-seat side of the aisle of such aircraft as the McDonnell Douglas DC-9. These bins, designated ESCI provide more stowage room, than the typical originally installed bins, although they may also be installed as original equipment. Moreover, the bins have a longer base extending further toward the aisle. Thus, while other luggage bins accommodate, for example, a garment bag of 22.6 inches' width, the ESCI III bin will stow a 25.8 inch garment bag. This additional "shelf width" for storage is important since it eliminates the forcing and deforming of garment bags to fit into an overhead bin. In general, the ESCI III luggage bins provide about 17% increase in volume, per bin door.

While the three- two-abreast seating arrangement described above provides an opportunity for installation of larger bins on the three-abreast side of the aisle, opportunities also exist for increasing luggage space on the two-seat side of the aisle, or in aircraft with a different seating arrangement, subject to compliance with FAA regulations and bin support load bearing capability.

Although the ESCI III concept of Heath Tecna provides a solution to the demand for increased carry-on luggage capacity, airlines are seeking less expensive methods of upgrading existing aircraft carry-on luggage storage capacity. The ESCI concept, as applied to existing aircraft, requires removal of the existing luggage bins and replacement with the new larger bins. There is an identified need for increasing overhead luggage bin capacity at lower cost than the complete removal and replacement of originally installed bins.

SUMMARY OF THE INVENTION

The invention provides luggage storage bins of expanded capacity for use in cabins of aircraft, trains, and the like. According to the invention, existing luggage bins are increased in capacity by the addition of a bin extension mounted at the opening to the bin. The bin includes a substantially rectangular base panel having vertical end bulkheads at farthest-apart opposite ends thereof; and a top portion extending between upper ends of the bulkheads, to produce a rectangular box shape with an open rear and front. The open rear of the bin extension cooperates with, and is mechanically attachable to, the opening of an existing bin so that surfaces of the base and sides of the bin are coextensive with surfaces of the base and side bulkheads, respectively, of the bin extension. A door may be provided to cover a frontal opening of the bin extension. This door may be of the same, or different type from that of the original bin. The invention also provides luggage bins of expanded storage capacity that include an existing bin and a bin extension.

The bin extensions of the invention are readily installed to expand the capacity of bins of aircraft, particularly aircraft like the McDonnell Douglas DC-9/MD80 that has a seating arrangement with three seats on one side of a passenger aisle and two seats on the other. While the bin extensions are ideally suited for expanding the luggage capacity of the overhead bins on the three-seat side of the aisle, the extensions may also be used on bins on the two-seat side of the aisle, or in aircraft cabins with a different seating arrangement, provided that the extended bins do not intrude into passenger aisle space in violation of FAA regulations and the existing bin support structures have the load bearing capability to bear the added loads of bin extensions and luggage. Accordingly, the bin extensions may also be used to expand the capacity of side bins of aircraft that have a central aisle with two seats on either side, or centerline bins found in wide-bodied aircraft.

According to the invention, the door, door latches, handrails, and other trim features of the existing overhead luggage bins may optionally be reused. Thus, for example, the original doors, hinge, and latches may be removed from the original luggage bin to allow mounting of the bin extension to the luggage bin. Thereafter, the door, hinge, and door latches may be fitted to the bin extension. In many instances, the extension would also include an underside filler panel that would adjoin and align with the inboard edge of the existing passenger service unit, but in certain instances this panel may not be required. The inboard end of the extension may be covered by the trim removed from the original filler panel inboard ends, or new trim may be added for updated aesthetics. Likewise, the door may be of new design to update aesthetics of the cabin.

While it is contemplated that the bin extensions of the invention may be installed without structural modification, such modifications may be made, if necessary, to support the additional luggage load.

By expanding the storage space of existing bins, the invention also eliminates the potential waste of the original bins that might occur if they were completely replaced with new larger bins. Consequently, the invention also provides an environmental benefit, to the extent that the originally removed bins may not be completely recyclable and their disposal would have utilized increasingly scarce landfill space. Since bins are fabricated from nonbiodegradable organic polymeric material, it is more desirable to reuse the bins as far as possible.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The extensions for storage bins of the invention may be used to expand the storage space of aircraft luggage bins, train luggage bins, and the like. Preferably, the original luggage bin has a doorway from which the door may be removed to allow mounting of the bin extension to the bin at the doorway.

While the following description relates to embodiments of the invention that are more specific to aircraft carry-on luggage bins, a person of ordinary skill in the art will readily appreciate that the invention may be applied to other storage bins, including luggage storage bins in trains, and the like. In the specification and claims the term "mechanical attachment" encompasses those methods used and approved in the aircraft industry, including, but not limited to attachment by nuts and bolts, rivets, screws, threaded bolts into threaded inserts, and adhesive bonding.

Figure 1:
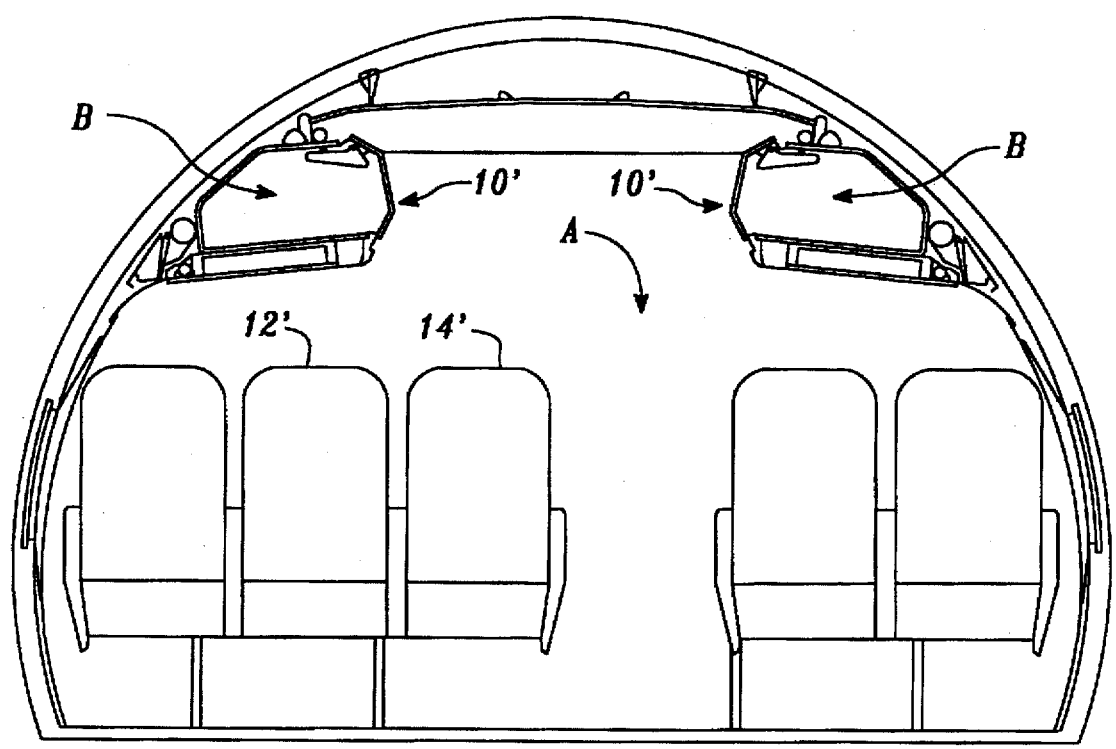
FIG. 1 is a schematic cross section of an aircraft cabin showing the mounting of original luggage storage bins.
Figure 2:
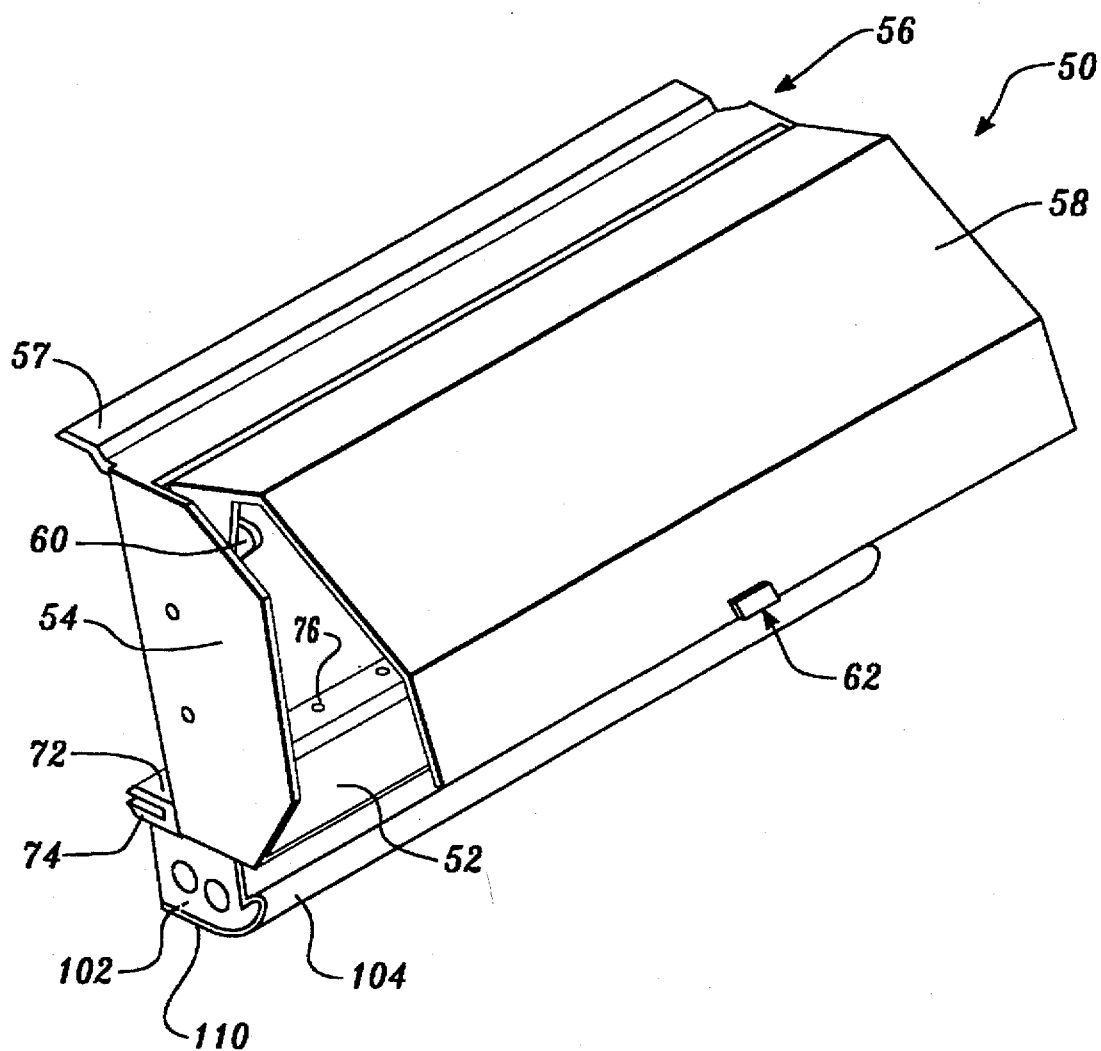
FIG. 2 is a perspective view of an embodiment of the bin extensions of the invention.

To facilitate understanding of the invention, reference may be had to FIG. 2, illustrating a not-to-scale perspective view of a bin extension according to the invention. The bin extension 50 has a substantially rectangular planar base 52, preferably fabricated from a composite of a polymeric material, such as phenolic-based resins. Vertical planar side bulkheads 54 are located at each of the farthest opposite ends of base 52. A roof 56 extends between upper ends of opposing bulkheads 54 to produce a rectangular box-shaped bin extension.

In the embodiment shown, to facilitate engagement of the bin extension with a front end of an existing carry-on luggage storage bin of an aircraft, a rear of the base 52 has optional outwardly extending parallel horizontal flange members 72 and 74. Holes 76 for receiving rivets or screws are provided at spaced intervals along both flange members. The spacing between the flange members is sufficient to receive a frontal edge of the base of an existing bin. The base 52 of the bin extension is then mechanically fixedly attached to the base of the existing bin by screws or rivets that extend through holes 76 to engage both members and the edge portion of the existing bin base.

The side bulkheads 54 of the bin extension overlap the side bulkheads of the existing bin and are mechanically attached, for example, by rivets.

A rearward projecting wing 57 of roof 56 is designed to extend over a top panel of the existing bin. Desirably, roof 56 is fabricated from aluminum, or is a relatively rigid panel of a composite material, so that wing 57 also provides support for the bin extension by mechanical attachment to the inboard edge of the top panel of the existing bin and end bulkheads 54.

A door 58 is pivotally mounted at each bulkhead to hinge 60 to cover the frontal opening of the bin extension. A latch 62, located near a lower edge of the door, engages a cooperating latch piece (not shown) located near the base 52 of the bin extension. Thus, door 58 opens upward to allow stowage or removal of luggage, and closes downward to seal the luggage storage space contained within the existing bin and the bin extension. While the embodiment of FIG. 2 shows a single door, additional doors may be added for longer bins or for convenience. Further, the door may be either the same (or similar) door originally attached to the bin, or may be of a different shape to update the aesthetics of the cabin. Clearly, the frontal edges of the bin base 52 and side bulkheads 54 must be contoured to conform to the door shape to ensure sealing of the door to these edges when the door is closed. The illustrated embodiment shows reuse of the original bin door.

Figure 3:
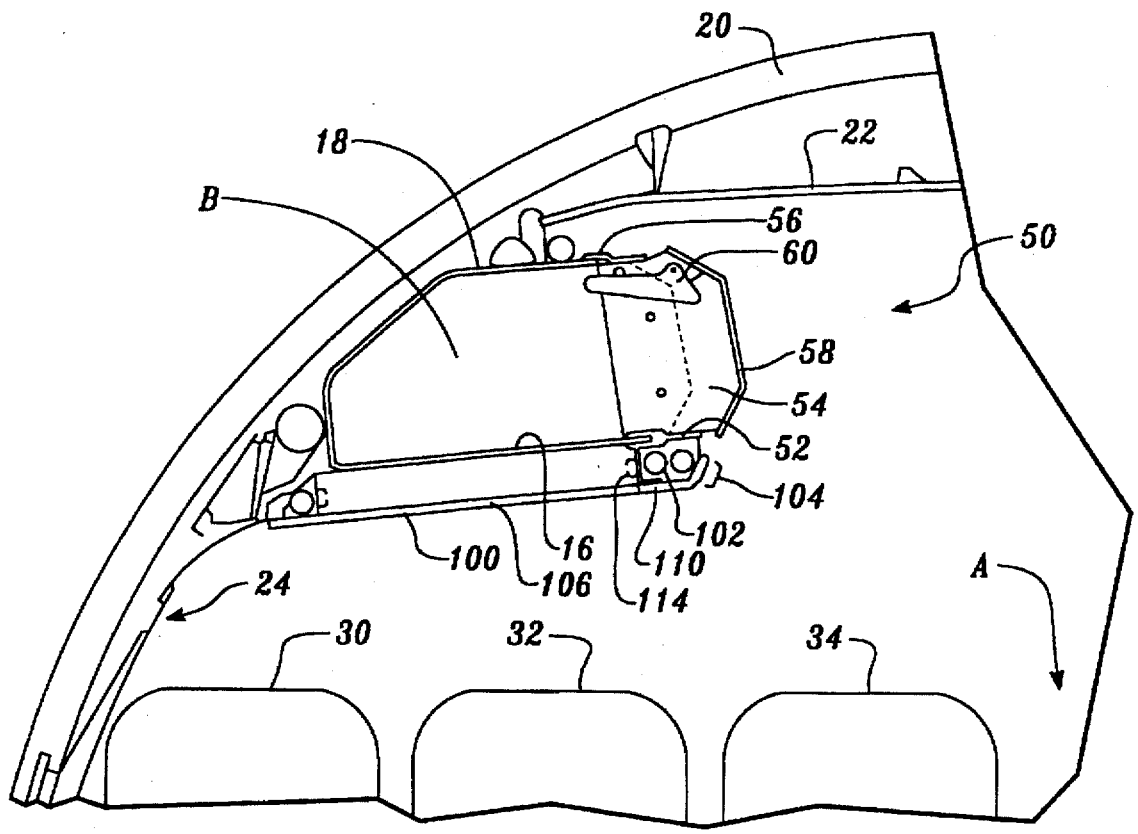
FIG. 3 is a schematic cross section of an aircraft cabin illustrating an embodiment of the bin extensions of the invention in end view.

An embodiment of the bin extension, as applied to a side carry-on luggage bin, is illustrated in FIG. 3, which shows a partial cross section of an aircraft cabin including the outer airframe 20, seats 30, 32, and 34 extending from the airframe to the aisle A, and a luggage bin B mounted above the seats. While the aircraft shown is of a type with three seats on one side of the aisle and two on the other, it should be understood that the bin extensions may be applied to bins in any aircraft, regardless of seating configuration but subject to FAA regulations and load bearing strength of bin supports. Structural modifications may be made to suit load requirements. The existing bin B is mounted to the airframe 20 with brackets, as is conventional. Passengers in the aircraft cabin are shielded from the airframe by facing panels, such as roof panel 22 extending across the upper section of the aircraft and terminating in the vicinity of the rear of luggage bin B; and side panels 24 extending from the vicinity of the lower rear of the luggage bin B to the floor (not shown) of the aircraft cabin.

As shown in FIG. 3, bin extension 50 is mounted on the former doorway of luggage bin B. The base 52 of extension 50 is coextensive with the base 16 of the existing luggage bin and extends the effective shelf width of the bin. Further, bin extension end bulkhead 54 is mechanically fastened to the existing bin's end bulkheads, while rear wing portion 57 of roof 56 extends over and is mechanically attached to the edge of the top panel 18 of the luggage bin.

In order to mount the bin extension onto the bin, the existing door, door hinge, and door latch must be removed, along with trim items located at the bullnose of the original bin. These items include the frontal bullnose rail and a handrail, if any. New bullnose diaphragms 102 and an elongated, substantially horizontal and planar filler panel 110 are sized to fit between the inboard passenger unit support 114 and the extension bullnose trim details, as shown in FIG. 3. The filler panel 110 and diaphragm 102 are mechanically attached to the base of the extension 52 so that an undersurface of the filler panel is coextensive with a base panel 106 of the passenger service unit. This provides an aesthetically pleasing extended base panel. A handrail 104, and any other frontal trim features removed from the original bullnose, are then mounted to the inboard end of filler panel 110.

In accordance with the invention, the bin extension may add as much width to the shelf space, and hence luggage storage volume, as FAA regulations and bin support load bearing capabilities allow. Preferably, the extension has a base width in the range of about two to about eight inches, or more.

While the foregoing detailed description of the preferred embodiment relates to aircraft overhead carry-on luggage storage bins, a person of skill in the art will readily appreciate that the invention is also applicable to a variety of other storage bins. Any changes and modifications made to the invention, that do not depart from the scope and spirit of the invention, are encompassed in the following claims.

We claim:

1. An extended luggage bin for aircraft, the extended bin comprising:
   (a) an existing shelf-type luggage bin portion having a storage space therein surrounded by a bin base, opposite bin sides extending upwardly from the base, a bin top extending between upper ends of the bin sides, and a bin rear side extending from a rear portion of the base to a rear portion of the top, the storage space accessible through an opening on a frontal side of the bin for placing luggage in said space; and
   (b) a modular bin extension mounted around the opening on the frontal side of the existing bin portion, the extension comprising:
      (i) a base portion having a rear edge substantially equal to the length of the base of the existing luggage bin portion, the rear edge of the base portion attached to a from edge of the base of the existing luggage bin portion to form a continuously extending expanded bin base;
      (ii) spaced sides, extending upward from opposite ends of the bin extension base portion, each of the sides mechanically attached to a nearest side of the existing luggage bin portion; and
      (iii) a door mounted to cover a frontal opening of the bin extension.

2. The extended luggage bin of claim 1, wherein the base of the bin extension is substantially rectangular, and the width of said base is from about two to about eight inches.

3. The extended luggage bin of claim 1, wherein the rear edge of the base portion of the bin extension comprises two parallel elongate members spaced apart to receive a front edge of the base of the existing bin portion therebetween.

4. The extended luggage bin of claim 1, further comprising a substantially planar bin extension roof extending above the base portion and between upper edges of the sides of the bin extension.

5. The extended luggage bin of claim 4, wherein the roof comprises a wing at a rear edge thereof, the wing extending over a portion of the top of the existing bin portion.

6. In a luggage bin having a planar base, a rear side extending upward from a rear edge of the base and forward over the base, and bulkheads at each end of the bin extending to enclose an area between the rear side and the base to provide a storage space with an opening, at a frontal side of the bin, for insertion of luggage into the storage space; the improvement comprising a modular bin extension mounted around the opening of the luggage bin, the modular extension comprising:
   (a) a bin extension base portion having a rear edge substantially equal to the length of the base of the luggage bin, the rear edge of the base portion adapted for attachment to a front edge of the base of the luggage bin to form a coextensive expanded bin base;
   (b) bin extension spaced sides, extending upward from longitudinally opposite ends of the bin extension base portion, the sides each mechanically attached to a nearest bulkhead of the luggage bin; and
   (c) a door mounted to cover a frontal opening of the bin extension.

7. The bin of claim 6, wherein the rear edge of the bin extension base portion comprises two parallel elongate members spaced apart to receive a frontal edge of the bin base therebetween.

8. The bin of claim 6, wherein the bin extension further comprises a substantially planar bin extension roof spaced from the base portion and extending between upper edges of the sides of the bin extension.

9. The bin of claim 8, wherein the roof comprises a wing at the area edge thereof, the wing extending over a portion of a leading edge of the rear side of the bin.

10. The bin of claim 6, wherein the base of the bin extension is substantially rectangular, and the width of said base is from about two to about eight inches.

11. A modular extension for mounting on an existing luggage bin to expand the interior storage space of the existing bin, the modular bin extension comprising:
   (a) a bin extension base portion having a rear edge substantially equal to the length of a base of the existing luggage bin, the rear edge of the base portion comprising for attachment to the base of the existing luggage bin to form a continuously extending expanded bin base;
   (b) a pair of bin extension sides, extending upward from longitudinally opposite ends of the bin extension base portion, the sides of substantially equal height to the height of sides of the existing luggage bin; and
   (c) a door, hingedly mounted to cover a frontal opening of the bin extension.

12. The bin extension of claim 11, wherein the base of the bin extension is substantially rectangular, and the width of said base is from about two to about eight inches.

13. The bin extension of claim 11, wherein the means for attachment at the rear edge of the base portion comprises two parallel elongate members spaced apart to receive a frontal edge of a base of an existing therebetween.

14. The bin extension of claim 11, further comprising a substantially planar bin extension roof extending between upper edges of the sides of the bin extension.

15. The bin extension of claim 14, wherein the roof comprises a wing at a rear edge thereof, the wing adapted for extending over a portion of a top of an existing bin.

* * * * *

UNITED STATES PATENT AND TRADEMARK OFFICE
CERTIFICATE OF CORRECTION

PATENT NO. : 5,687,929
DATED : November 18, 1997
INVENTOR(S) : J.E. Hart et al.

It is certified that error appears in the above-indentified patent and that said Letters Patent is hereby corrected as shown below:

| COLUMN | LINE | |
|---|---|---|
| [73]<br>Pg. 1, col. 1 | Assignee | "Plesanton," should read --Pleasanton,-- |
| [57]<br>Pg. 1, col. 2 | Abstract<br>line 9 of text | "from and rear." should read --front and rear.-- |
| 5<br>(Claim 1, | 43<br>line 17) | "from edge" should read --front edge-- |
| 6<br>(Claim 13, | 57<br>line 4) | After "existing" insert --bin-- |

Signed and Sealed this

Seventh Day of April, 1998

Attest:

BRUCE LEHMAN

*Attesting Officer*          Commissioner of Patents and Trademarks